(12) United States Patent
Fujiwara et al.

(10) Patent No.: US 6,789,444 B2
(45) Date of Patent: Sep. 14, 2004

(54) SHIFT LEVER DEVICE WITH LOCKING MECHANISM

(75) Inventors: Ryoichi Fujiwara, Shizuoka-ken (JP); Yoshimasa Kataumi, Shizuoka-ken (JP)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 7 days.

(21) Appl. No.: 10/107,559

(22) Filed: Mar. 27, 2002

(65) Prior Publication Data

US 2002/0139214 A1 Oct. 3, 2002

(30) Foreign Application Priority Data

Mar. 28, 2001 (JP) ........................... P2001-094121

(51) Int. Cl.[7] ............................................. B60K 20/02
(52) U.S. Cl. .................. 74/473.23; 74/473.3; 74/537
(58) Field of Search ...................... 74/473.21, 473.23, 74/473.24, 473.25, 473.26, 473.28, 473.3, 527, 532, 533, 537, 538; 192/220–220.4

(56) References Cited

U.S. PATENT DOCUMENTS

| | | | | |
|---|---|---|---|---|
| 5,309,744 A | * | 5/1994 | Kito et al. .................. 70/247 |
| 5,431,266 A | * | 7/1995 | Ito et al. .................. 192/220.6 |
| 6,189,398 B1 | * | 2/2001 | Kataumi et al. .............. 74/423 |
| 6,301,994 B1 | * | 10/2001 | Syamoto ...................... 74/538 |
| 6,378,395 B1 | * | 4/2002 | Kataumi et al. ......... 74/473.31 |

FOREIGN PATENT DOCUMENTS

JP 11245680 9/1999

* cited by examiner

*Primary Examiner*—David A Bucci
*Assistant Examiner*—Timothy McAnulty
(74) *Attorney, Agent, or Firm*—Brenda O. Holmes; Kilpatrick Stockton LLP (57) ABSTRACT

A shift lever device which includes a housing, a shift lever, a knob, a rod with a key and a locking mechanism. The shift lever has a tube and a supporting member provided with a pivot supported by the housing on the vehicle body and a base block to which the tube is connected. The knob is connected to the tube. The rod inserted through the shift lever, is movable in an axial direction by operating the knob button of the knob. The key has a detent engaging portion to engage with a detent plate of the housing. The locking mechanism has a lock lever with a locking portion at its tip. The lock lever swings so that the locking portion is interposed between the base block and the key to lock movement of the rod, thus maintaining the engagement of the detent engaging portion with the detent plate.

7 Claims, 10 Drawing Sheets

SHIFT LEVER DEVICE WITH LOCKING MECHANISM

BACKGROUND OF THE INVENTION

1. Field of the Invention

The present invention relates to a shift lever device provided with a locking mechanism for use in the automatic transmission of a vehicle or the like.

2. Description of the Related Art

In a conventional shift lever device, a shift lever is rotatably supported on a housing fixed to a vehicle body, for example, as swingable in a longitudinal direction (a shifting direction) of the vehicle, and a rod is inserted into the shift lever as movable in an axial direction. By operating a knob button of a knob provided on an upper end of the shift lever, the rod is moved, and a detent engaging portion provided on a lower end thereof is disengaged from a particular detent groove provided on the housing, thus enabling the shift lever to be shifted.

A locking mechanism is provided to lock the engagement of the detent engaging portion with the P-range groove when the shift lever is at a parking position. The locking mechanism includes a locking means disposed in the vicinity of the P-range groove, which engages with the detent engaging portion and prevents disengagement thereof from the P-range groove.

In the conventional shift lever device, the operating force of the knob button is applied to the locking means via the rod. In order to bear the force, the locking means has to be firmly supported by the locking mechanism and the locking mechanism cannot be compact. Moreover, since screws and the like are used to firmly fix the locking mechanism to the housing, increases in the number of parts as well as assembly steps have been inevitable.

SUMMARY OF THE INVENTION

An object of the present invention is to provide a shift lever device with a simple construction, to contribute to reduction in the number of parts, assembly steps and production costs.

A first aspect of the present invention is a shift lever device comprising: a housing fixed to a vehicle body; a shift lever comprising a tube and a supporting member provided with a pivot rotatably supported by the housing and a base block to which the tube is connected; a knob having a knob button, being connected to the tube; a rod inserted through the shift lever, the rod being movable in an axial direction by operating the knob button; a key provided on an end of the rod, the key having a detent engaging portion for engaging with a detent plate of the housing; and a locking mechanism disposed beside the shift lever, having a lock lever with a locking portion at a tip thereof, the lock lever swingable about a predetermined axis, wherein the lock lever swings so that the locking portion is interposed between the base block and the key to lock movement of the rod, thus maintaining the engagement of the detent engaging portion with the detent plate.

Preferably, the key has a first face facing the base block, the base block has a second face facing the key, the second face is provided with a guiding hole for guiding the rod, the guiding hole being sized so as to stop the key, and the locking portion of the lock lever is inserted into and removed from a gap formed between the first face and the second face by swinging the lock lever on a plane substantially parallel to the first face and the second face. And the axis about which the lock lever swings is substantially parallel to the axial direction of the rod in the shift lever at a parking position.

And preferably, the locking mechanism is mounted on the detent plate.

According to the first aspect as described above, when the rod and the key move to a detent plate side and the detent engaging portion engages with the detent plate, a gap is created between the base block and the key. When the locking portion is interposed in this gap, the rod cannot move to the knob side no matter how the knob button is operated. Accordingly, the detent engaging portion cannot disengage, whereby the shift lever can not shift to the other position. In other words, the shift lever is put in a locked state. Since it is mainly a compression, not a shear or twist, which acts on a locking portion of the lock lever interposed in the gap, the lock lever, the locking mechanism and supports thereof can be compact and light in weight.

As described above, the secure lock of the shift lever is achieved simply by interposing the locking portion of the lock lever between the base block and the key, and the simple construction of the shift lever device contributes to a reduction in the number of parts, assembly steps and production costs.

A second aspect of the present invention is the shift lever device according to the first aspect, wherein the lock lever comprises a displacement absorber elastically deformable with respect to force acting on the lock lever.

According to the second aspect, due to an elastic deformation of the displacement absorber provided on the lock lever, the displacement of the lock lever is absorbed, when a force is applied thereon in the event of shifting the shift lever with the locking portion of the lock lever pinched between the base block and the key. Accordingly, force is not transferred to a swing axis of the lock lever, thereby protecting the locking mechanism. The driving means such as a solenoid for operating the lock lever is also protected from the force acting thereon. Thus the reliability of the locking mechanism is enhanced.

A third aspect of the present invention is the shift lever device according to the first aspect, wherein a tip of the lock portion is tapered.

According to the third aspect, the lock lever can swing to dodge the key when the key moves to the range of the lever and bumps the tip thereof.

BRIEF DESCRIPTION OF THE DRAWINGS

The invention will now be described with reference to the accompanying drawings wherein.

DETAILED DESCRIPTION OF THE PREFERRED EMBODIMENT

An embodiment of the present invention will be explained below with reference to the drawings, wherein like members are designated by like reference characters.

As shown in FIGS. 1 to 9, in a shift lever device of this embodiment, a shift lever 1 with a knob 9 on its tip, is swingably supported at a lower end thereof by a housing 10 fixed to a vehicle body (not shown). By operating a knob button 11 disposed in the knob 9 to move a rod 2 inserted into the shift lever in an axial direction, a detent engaging portion 3 provided on the lower end of the rod 2 is pulled out of a detent groove 18 of a detent plate 17 provided on the housing 10. In this way, the shift lever 1 is enabled to shift in a shifting direction.

Figure 5:
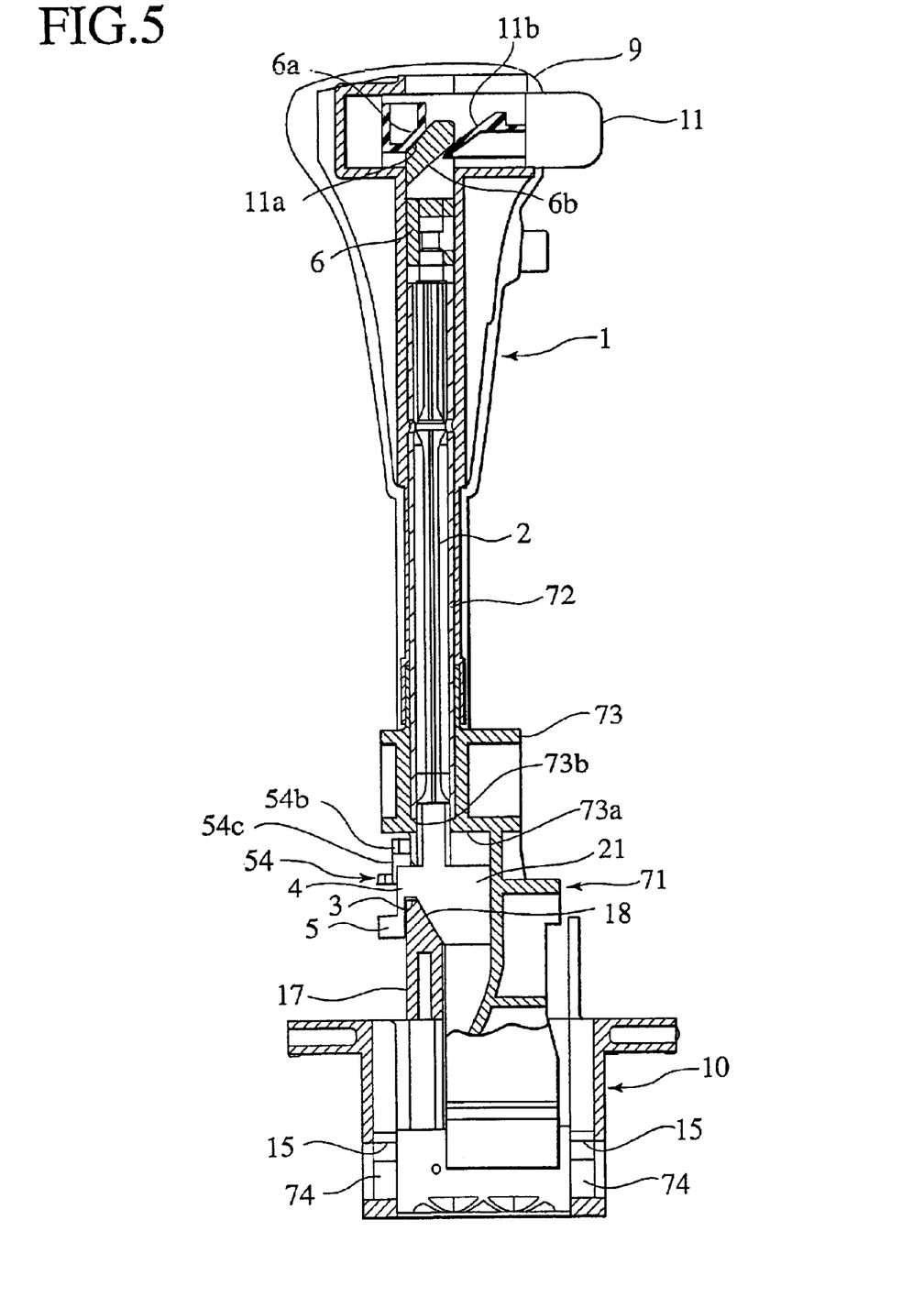
FIG. 5 is a cross sectional front view of the shift lever device locked in the P-range position, showing a state where a detent engaging portion is engaged with a detent groove of the P-range by pressure of a spring pushing a knob button in a knob outward.

The shift lever 1 includes a supporting member 71 on the lower end swingably supported by the housing 10, and a tube 72 having the knob 9 on a tip thereof, the tube 72 integrally protruding from the supporting member 71. In the supporting 30 member 71, as shown in FIG. 5, a guiding hole 73b for supporting the rod 2 movably in an axial direction is formed on a bottom wall 73a of a base block 73 (a second face) which holds the tube 72. On the lower end of the rod 2 extending from the guiding hole 73b, a key 21 large enough to be uninsertable into the guiding hole 73b and having the detent engaging portion 3 is provided. The key 21 has a top wall facing the bottom wall 73a of the base block 73 (a first face). The top wall of the key 21 and the bottom wall 73a are parallel to each other and perpendicular to the axial direction of the rod 2. Moreover, beside the shift lever 1, a locking mechanism 40 including a lock lever 54 is provided. The lock lever 54 is swingably supported about a swing pivot 54a, and has a locking portion 54b on a tip thereof made insertable into and removable from a gap formed between the bottom wall 73a and the top wail of the key 21.

In addition, a displacement absorber 54c is provided on the lock lever 54 at a position closer to the tip than the swing pivot 54a. The displacement absorber 54c elastically deforms with force acting on the locking portion 54b.

Now, description will be made in further detail regarding the foregoing constitution. Specifically, as shown in FIGS. 1 to 9, the tube 72 is a tubular rod made of metal or plastics, and the rod 2 made of metal or plastics is inserted into this tube 72. Moreover, the detent engaging portion 3 is a concave at the bottom end of the rod 2, and one side of the detent engaging portion 3 constitutes an arm 4 extending downward. A pin-shaped shaft 5 is integrally formed on a tip of the arm 4. Moreover, a push-up actuator 6 is integrally coupled to an upper end of the rod 2.

The supporting member 71 of resin is integrally formed by molding (insertion molding) with the tube 72 inserted into the base block 73 thereof. The knob 9 is fitted on so as to cover the tube 72 from topside. The rod 2 is inserted into the tube 72 from beneath the supporting member 71. The push-up actuator 6 is integrally coupled to the upper end thereof. An outside slope 6a and an inside slope 6b are formed parallel on an upper end of the push-up actuator 6.

The knob button 11 is held within the knob 9 as movable in a direction perpendicular to the rod 2, and the knob button 11 includes slopes 11a and 11b slidably abutting on the outside slope 6a and the inside slope 6b of the push-up actuator 6, respectively. Moreover, a spring (not shown) is provided inside the knob 9 to keep pushing the rod downward via the slope 11a and the outside slope 6a by pushing the knob button 11. Note that a spring may be provided inside the tube 72 for pushing the rod 2 downward. Accordingly, in the case the knob button 11 is pushed against the pressure of this spring, the rod 2 is pulled upward via the slope 11b and the inside slope 6b, thus pulling the detent engaging portion 3 out of the detent groove 18.

Moreover, a pivot shaft 74 is integrally formed at the bottom end of the supporting member 71. The pivot shaft 74 is rotatably fitted into bearings 15 formed on the housing 10, and is designed to support the shift lever 1 to be swingable in the longitudinal direction of the vehicle. Furthermore, the detent plate 17 is integrally formed at the approximate center of the housing 10, and a plurality of detent grooves 18 are formed along an upper edge of this detent plate 17. The detent grooves 18 of a P-range groove, an R-range groove, an N-range groove, a D-range groove, 2-range groove and 1-range groove are serially and adjacently provided from the front to the back of the vehicle.

Figure 11:
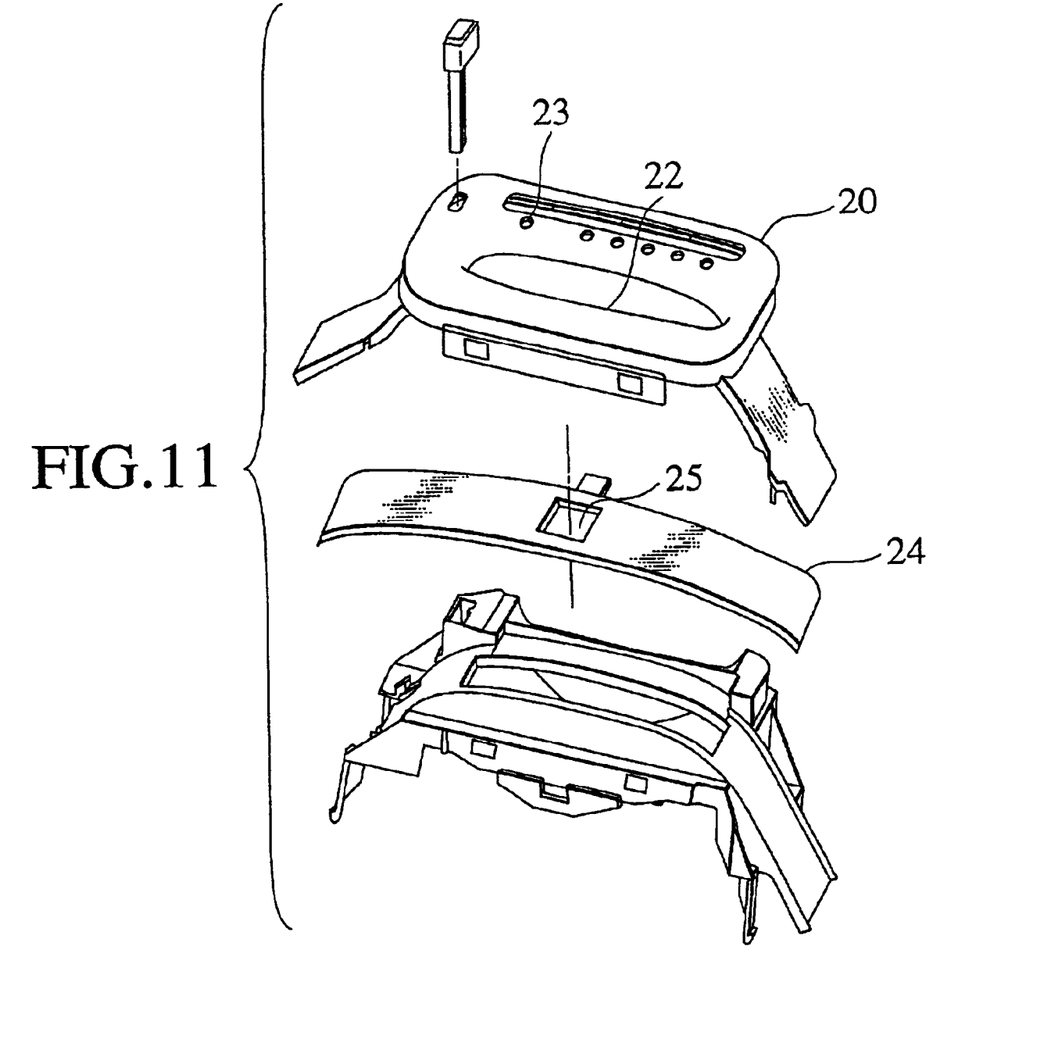
FIG. 11 is an exploded perspective view showing an indicator cover, a slide cover and a housing cover of the shift lever device.

An indicator cover 20 as shown in FIG. 11 is attached to top of the housing 10. A guide hole 22 is formed on the indicator cover 20 to allow the shift lever 1 to penetrate therethrough, and a transmission gear indicator 23 for indicating P, R, N. D, 2, 1 and the like is provided beside the guide hole 22. A slide cover 24 for covering the guide hole 22 of the indicator cover 20 has a hole 25 to allow the shift lever 1 to penetrate therethrough.

Figure 2:
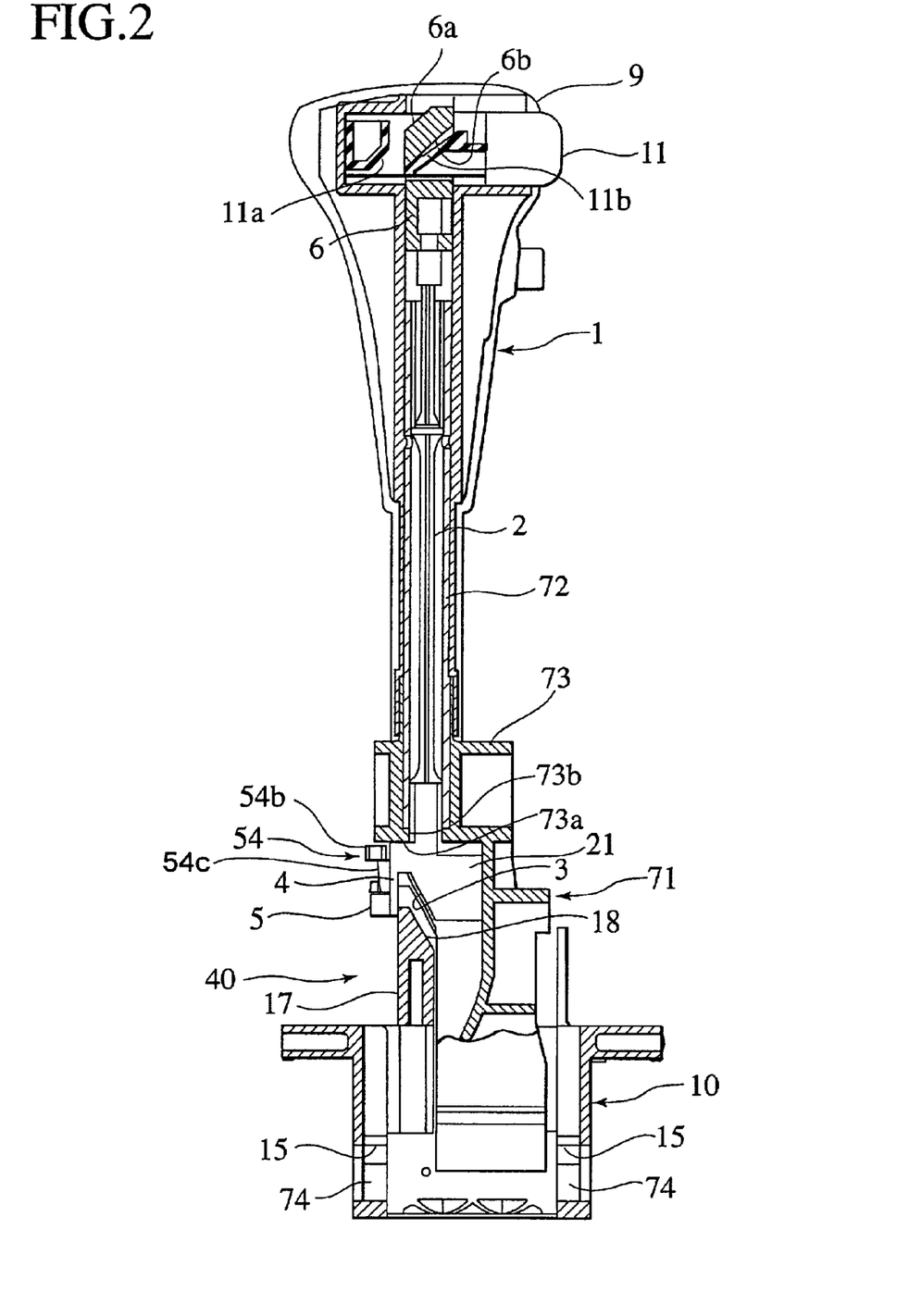
FIG. 2 is a cross sectional front view of the shift lever device, showing a state before locked in a P-range position.

Regarding the detent engaging portion 3 and the detent grooves 18, as shown in FIG. 2 and FIG. 5, the detent engaging portion 3 moves together with the rod 2 so as to be inserted into or extracted out of the detent grooves 18 such as P, R, N, D, 2 and 1.

Figure 1:
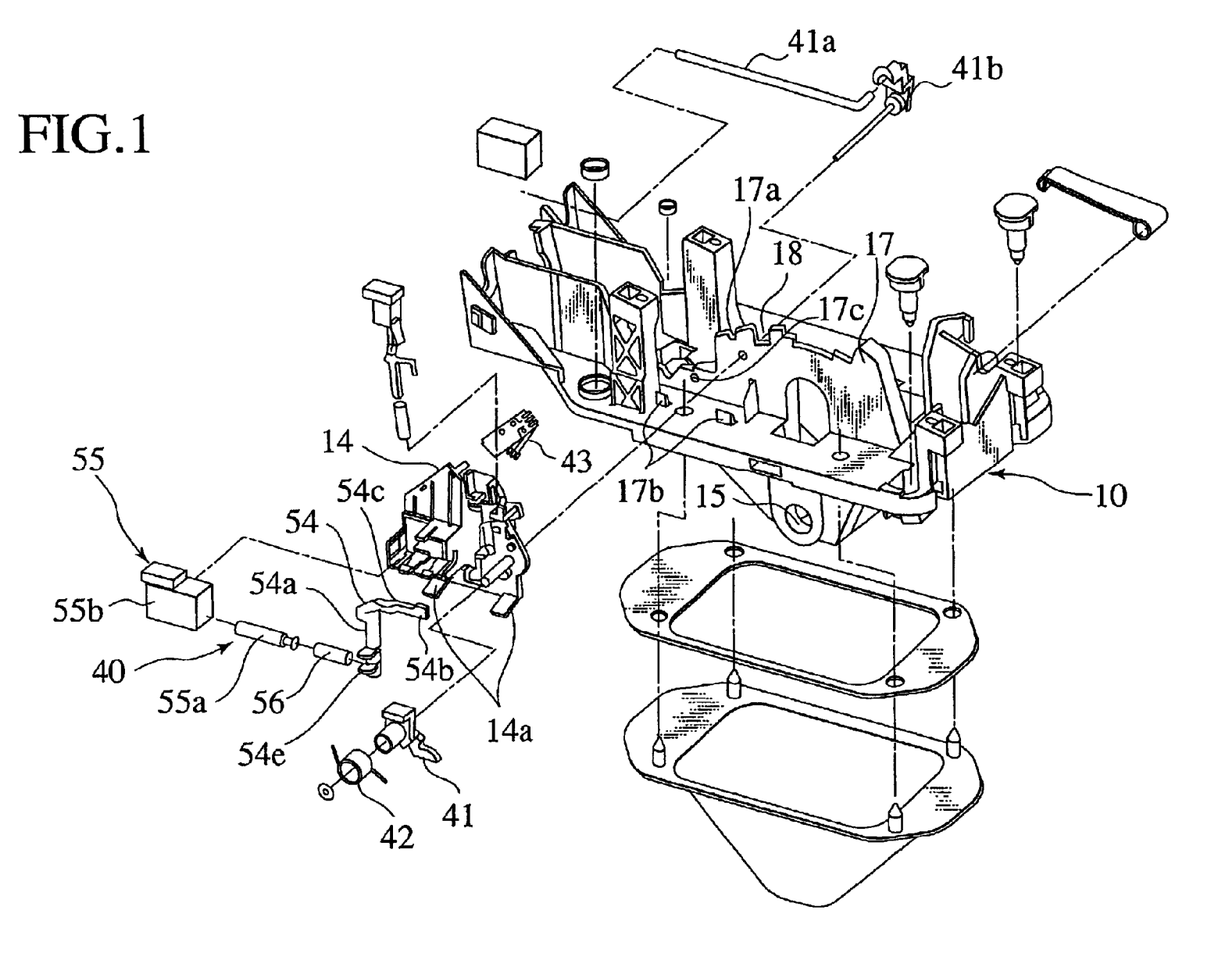
FIG. 1 is an exploded perspective view of a locking mechanism and a housing of a shift lever device disclosed as one embodiment of the present invention.

Moreover, as shown in FIG. 1, a unit base 14 is provided on the housing 10 beside the detent plate 17, and the locking mechanism 40 having the lock lever 54 is provided on this unit base 14.

The locking mechanism 40 includes a key lever 41, a return spring 42, a P-position detecting switch 43, the lock lever 54, linear drive means 55 and a coil spring 56.

The unit base 14 is fitted onto the housing 10 by hooking a L-shaped hook (not shown) integrally formed on the unit base 14 on a concave portion 17a formed on the detent plate 17, and by inserting a positioning protrusion (not shown) formed on the unit base 14 into a hole 17c formed on the detent plate 17, thus disposing the unit base 14 beside the detent plate 17. Then, the unit base 14 is fixed to the housing 10 in a manner in which a retainer 14a formed on the bottom of the unit base 14 engages with a claw 17b formed on a planar part of the housing 10.

The key lever 41 is provided turnably on the unit base 14. When the detent engaging portion 3 enters the detent groove 18 in the P-range groove, the shaft 5 of the key 21 pushes the key lever 41 so that a tip thereof turns downward. The return spring 42 imparts a revolving force to the key lever 41 in order to turn the tip upward. The P-position detecting switch 43 is designed to detect whether the shift lever 1 has been securely positioned in the P-range groove (at a parking position), by means of a protrusion (not shown) provided on the supporting member 71 operating the P-position detecting switch 43 when the shift lever 1 shifts to the P-range. Moreover, the turning angles of the key lever 41 is converted into linear displacement by a mechanical transmitting means 41a, such as a cable, when the detent engaging portion 3 enters the P-range groove, and the displacement will be transmitted to a key lock mechanism (not shown).

Figure 4:
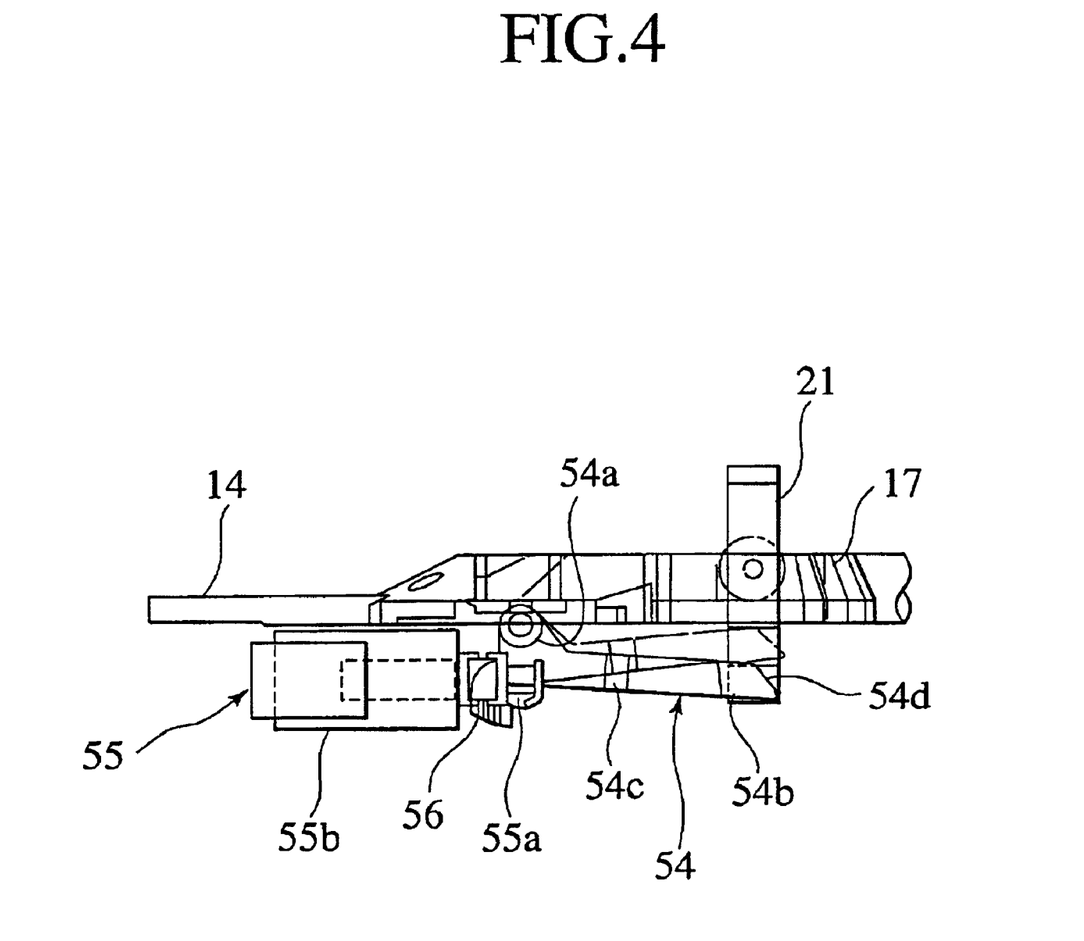
FIG. 4 is a plan view of the substantial parts of the shift lever device, showing the key, the locking mechanism and the detent plate in the state before locked in the P-range position.
Figure 9:
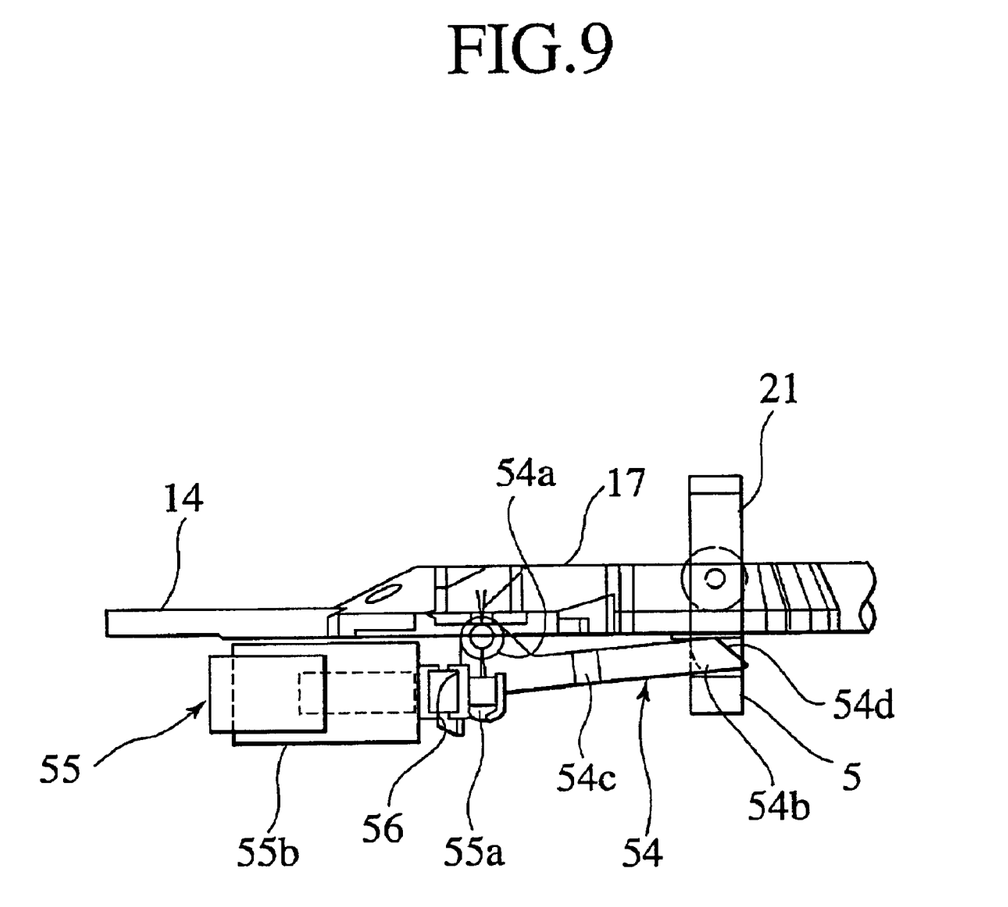
FIG. 9 is a plan view of the substantial parts of the shift lever device, showing the key, the locking mechanism and the detent plate in a state locked in the P-range position.
Figure 10:
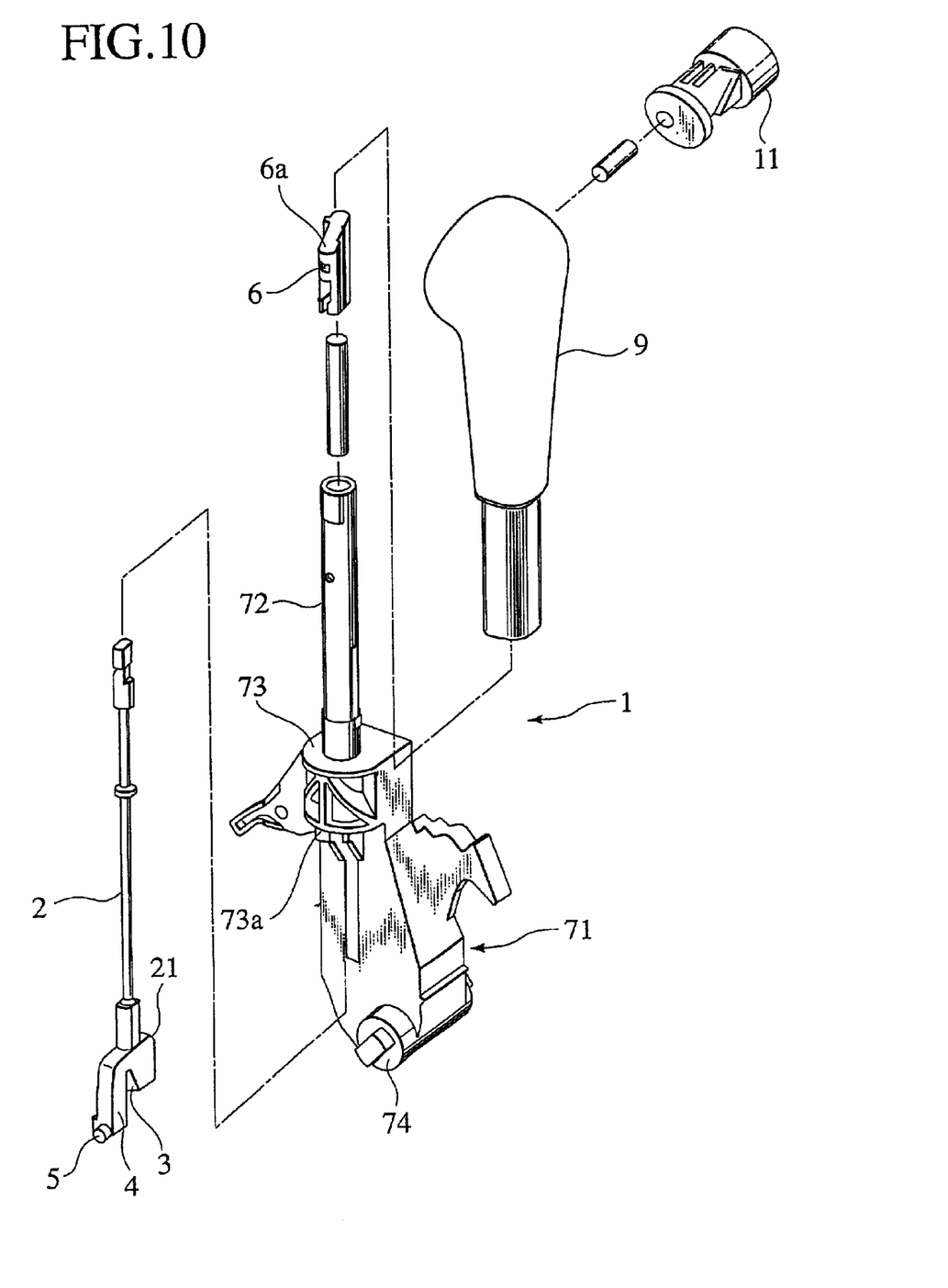
FIG. 10 is an exploded perspective view of the shift lever, the rod and the knob.

Regarding the lock lever 54, the swing pivot 54a is swingably supported on the unit base 14 mounted on the detent plate 17 so that the locking portion 54b is disposed beside the supporting member 71 of the shift lever 1 in the position of the P-range, and the locking portion 54b is made insertable into and removable from the gap formed between the bottom wall 73a and the top wall of the key 21 by the swing. The axis of the swing pivot 54a about which the lock lever 54 swings is substantially parallel to the axial direction of the rod 2 inserted into the shift lever 1 in the position of the P-range. And the lock lever 54 swings on a plane substantially parallel to the top wall of the key 21 and the bottom wall 73a of the base block 73. The displacement absorber 54c is a thinned crank-shaped stage between the swing pivot 54a and the locking portion 54b. The displacement absorber 54c is designed to be elastically deformable upon receiving bending moments attributable to force acting in a longitudinal direction thereof or to displacement thereof. Moreover, as shown in FIG. 4 and FIG. 9, a tapered portion 54d is formed on a tip of the locking portion 54b. This tapered portion 54d bumps the key 21 when the shift lever 1 is moved from an R range to the P-range, for example, whereby the tapered portion 54d allows the lock lever 54 to swing outward to dodge the key 21. Meanwhile, a connector 54e to be connected to a plunger 55a of the linear drive means 55 is formed on the swing pivot 54a.

The linear drive means 55 linearly drives the plunger 55a with a solenoid 55b, thus swinging the lock lever 54. Note that this linear drive means 55 is used to turn and remove the locking portion 54b from the gap between the bottom wall 73a and the op wall of the key 21. Swinging the locking portion 54b to insert into the gap between the bottom wall 73a and the top wall of the key 21 is performed by pressure of the coil spring 56 surrounding the plunger 55a.

Figure 3:
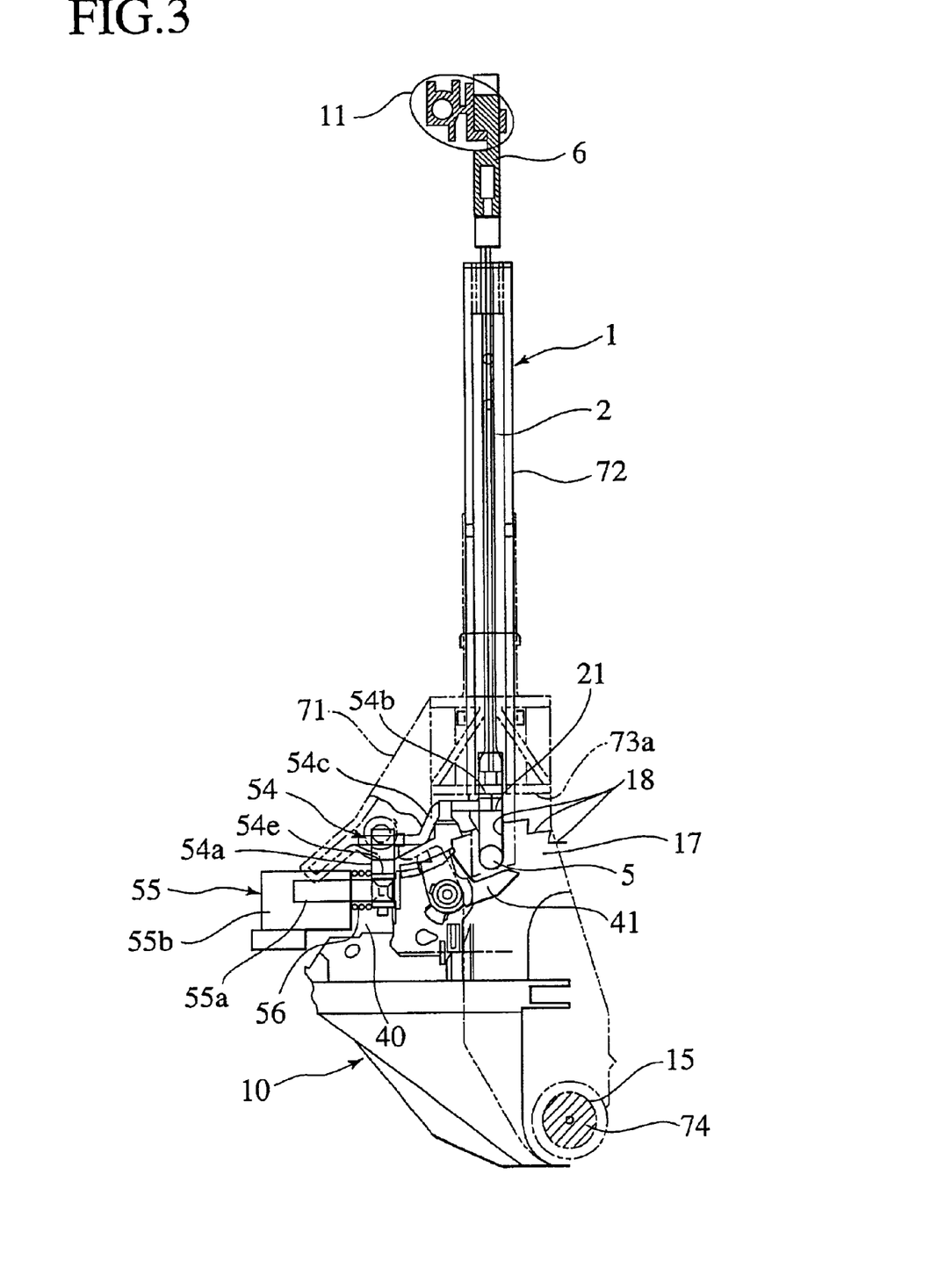
FIG. 3 is a partially cross sectional side view of the substantial parts of the shift lever device, showing a rod, a key, the locking mechanism and a detent plate in the state before locked in the P-range position.
Figure 6:
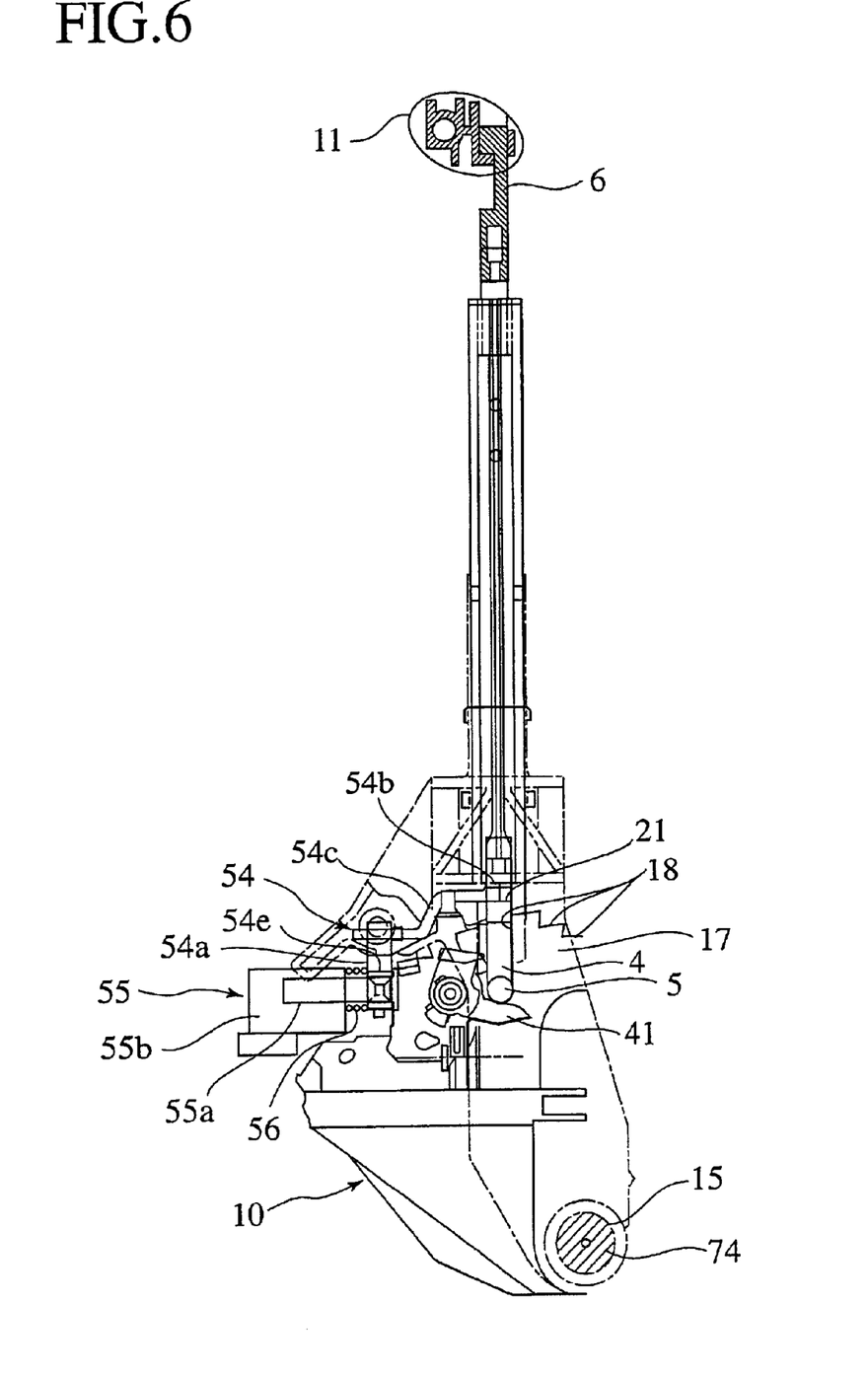
FIG. 6 is a partially cross sectional side view of the substantial parts of the shift lever device locked in the P-range position, showing the state where the detent engaging portion is engaged with the detent groove of the P-range by pressure of the spring pushing the knob button in the knob outward.
Figure 7:
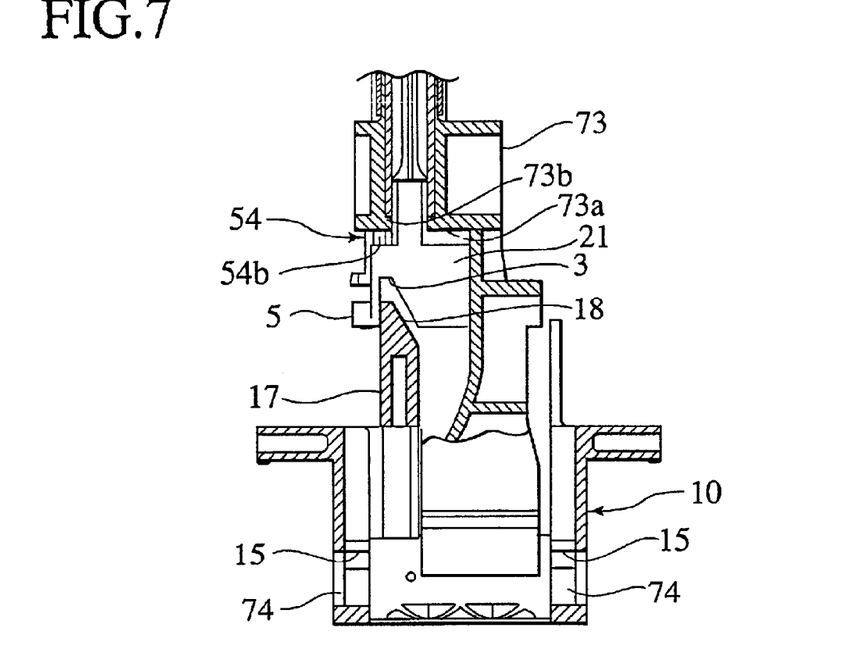
FIG. 7 is a cross sectional front view of the substantial parts of the shift lever device, showing the locking mechanism stops disengagement of the key from the P-range position.
Figure 8:
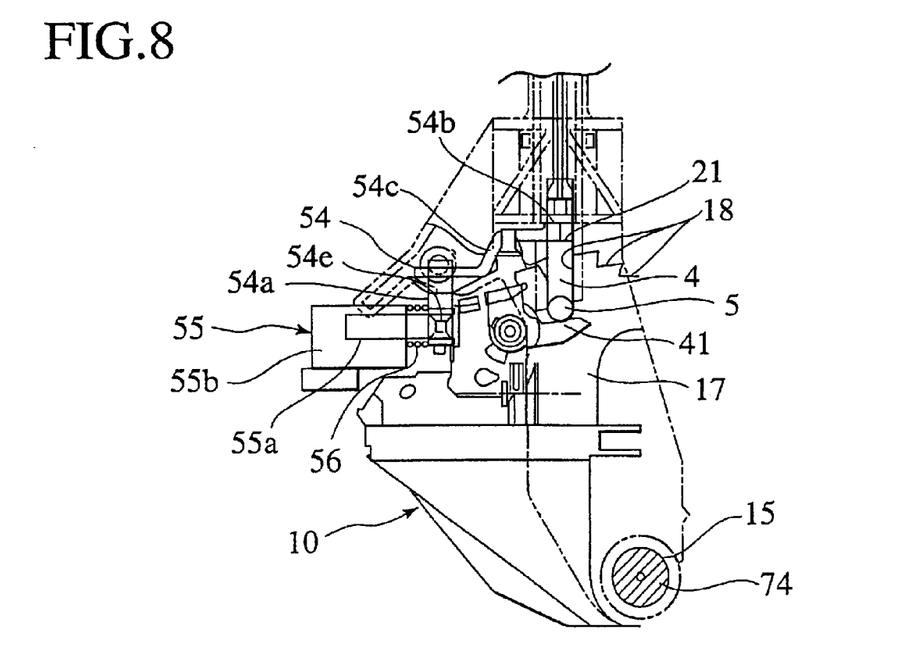
FIG. 8 is a cross sectional side view of the substantial parts of the shift lever device, showing the locking mechanism stops disengagement of the key from the P-range position.

Next, a description will be made regarding the operation of the shift lever device having the above-described constitution. First, as shown in FIG. 2 and FIG.3, when the shift lever 1 is moved to the P-range, the rod 2 moves downward as shown in FIG. 5 and FIG. 6 owing to the pressure of the spring provided inside the knob 9, whereby the detent engaging portion 3 thereof enters the detent groove 18 for the P-range. Then, a gap of a predetermined size is created between the bottom wall 73a of the base block 73 of the shift lever 1 and the top wall of the key 21 of the rod 2, and the locking portion 54b of the lock lever 54 pushed by the coil spring 56 enters this gap. In this event, the rod 2 cannot move upward as shown in FIG. 7 and FIG. 8. Accordingly, the detent engaging portion 3 cannot be pulled out of the detent groove 18 no matter how much the knob button 11 is pushed, therefore the shift lever 1 cannot be moved to another range such as a D range. In other words, the shift lever 1 is put into a locked state. When the solenoid 55b is electrically conducted upon stepping on a brake pedal, the locking portion 54b turns toward the direction of removal from the gap between the bottom wall 73a and the top wall of the key 21, whereby the above-described locked state is released.

Moreover, when the detent engaging portion 3 enters the detent groove 18 for the P-range, the key lever 41 is pushed by the shaft 5 of the arm 4 to turn to operate the transmitting means 41a via a sub-lever 41b that turns integrally with the key lever 41, whereby such a movement is transmitted to the key lock mechanism. Alternatively, the transmitting means 41a may be fitted directly to a free-end of the key lever 41.

As described above, the secure lock of the shift lever 1 is achieved simply by interposing locking portion 54b of the lock lever 54 between the bottom wall 73a and the top wall of the key 21. The simple construction of the shift lever 1 contributes to a reduction in the number of parts, assembly steps and production costs. In addition, a force attributable to the bottom wall 73a and the key 21 acting on the locking portion 54b is mainly compression, and the force is not transferred to the swing pivot 54a of the lock lever 54 and the unit base 14. Accordingly, the lock lever 54 and a support of the unit base 14 for supporting the swing pivot 54a of the lock lever 54 can be compact and light in weight. The lock lever 54 can be sufficiently strong even if it is compact and made of multipurpose plastics, thus contributing to the downsizing and weight-saving of the locking mechanism 40 and production cost saving. Moreover, a hook, a claw and the like applicable to fitting means of the unit base 14 to the housing 10 simplify the assembly process.

Moreover, since a gap between the detent groove 18 and the detent engaging portion 3 in the longitudinal direction (a shifting direction) of a vehicle is inevitable for inserting the detent engaging portion 3, the shift lever 1 can move by a size of the gap when moving the shift lever 1 in a locked state. Accordingly, if the knob button 11 is pushed and the shift lever 1 is forcibly moved in the longitudinal direction with the locking portion 54b held between the bottom wall 73a and the top wall of the key 21, a force acts on the lock lever 54 via the locking portion 54b.

However, since the displacement absorber 54c is provided on the lock lever 54 in the position closer to the locking portion 54b than the swing pivot 54a, it is possible to absorb the force acting on the locking portion 54b and the displacement by the elastic deformation of the displacement absorber 54c. Therefore, it is possible to prevent excessive force acting on the swing pivot 54a and the lock lever 54 itself, or on the linear drive means 55. Accordingly, the locking mechanism 40 is protected, whereby the durability of the lock lever 54 or of the linear drive means 55 can be enhanced. Therefore, the reliability of the locking of the shift lever 1 is enhanced, meanwhile, the displacement absorber 54c may be provided on the support of the unit base 14 for supporting the swing pivot 54a, or on the connector 54e for connecting the plunger 55a instead.

Moreover, since the coil spring 56 of the linear drive means 55 which pushes the locking portion 54b into the gap between the bottom wall 73a and the top wall of the key 21 can elastically deform, the locking portion 54b can move toward the outside of the key 21 even when the key 21 is moved to the P-range position. Therefore, it is possible to prevent excessive force acting on the lock lever 54 or on the linear drive means 55. Note that the tapered portion 54d formed on the locking portion 54b is effective in allowing the lock lever 54 to swing smoothly toward the outside of the key 21 when the key 21 is moved to the P-range.

Although only one embodiment of the invention has been disclosed and described, it is apparent that the other embodiments and modification of the invention are possible.

What is claimed is:

1. A shift lever device, comprising:
   a housing provided with a detent plate;
   a shift lever comprising
     a lever member pivotably supported on the housing,
     a knob connected to the lever member, having a knob button,
     a rod provided through the lever member and linked to the knob button, and
     a key fixed to the rod and configured to be engageable with the detent plate of the housing, the key being movable relative to the lever member to an engagement position where the key engages with the detent plate; and
   a locking mechanism mounted on the housing, comprising a lock lever having a blocking portion at an end thereof, wherein
   as the key is in the engagement position, the lock lever is swingable to have the blocking portion pinched between a part of the lever member and the key.

2. The shift lever device according to claim 1, wherein the lever member is configured with a block portion, wherein the key is configured with a first face facing the block portion, the block portion is configured with a second face facing the key, the second face is provided with a guiding hole for guiding the rod, the guiding hole being sized so as to stop the key, and the blocking portion of the lock lever is interposed between the first face and the second face.

3. The shift lever device according to claim 1, wherein the locking mechanism is mounted on the detent plate and is located so that the lock lever can be disposed beside the shift lever when the shift lever is at a parking position.

4. The shift lever device according to claim 1, wherein the lever member is configured with a block portion, wherein the key is configured with a first face facing the block portion, the block portion is configured with a second face facing the key, the blocking portion of the lock lever is inserted into and removed from a gap formed between the first face and the second face by swinging the lock lever on a plane substantially parallel to the first face and the second face.

5. The shift lever device according to claim 1, wherein an axis about which the lock lever swings is substantially parallel to the axial direction of the rod in the shift lever in a state where the shift lever is at a parking position.

6. The shift lever device according to claim 1, wherein the lock lever comprises a displacement absorber elastically deformable with respect to force acting on the lock lever.

7. The shift lever device according to claim 1, wherein a tip of the blocking portion is tapered.

* * * * *